United States Patent [19]

Ichinose

[11] Patent Number: 4,717,978
[45] Date of Patent: Jan. 5, 1988

[54] SCREW SHAFT ADJUSTMENT MEANS FOR A MAGNETIC DISK DRIVE UNIT

[75] Inventor: Harunobu Ichinose, Itabashi, Japan
[73] Assignee: Copal Company Limited, Japan
[21] Appl. No.: 832,220
[22] Filed: Feb. 24, 1986
[30] Foreign Application Priority Data Feb. 28, 1985 [JP] Japan .............................. 60-28664[U]

[51] Int. Cl.⁴ .......................... G11B 5/55; G11B 21/08
[52] U.S. Cl. ..................................... 360/106; 360/109; 74/424.8 R
[58] Field of Search ......................... 360/106, 109, 104; 74/424.8 R, 89.15, 392, 396, 397; 369/223

[56] References Cited

U.S. PATENT DOCUMENTS

| | | | |
|---|---|---|---|
| 4,030,137 | 6/1977 | Dalziel | 360/106 |
| 4,096,537 | 6/1978 | Butsch | 360/106 |
| 4,097,908 | 6/1978 | Chou et al. | 360/109 |
| 4,131,923 | 12/1978 | Wachs et al. | 360/106 |
| 4,422,113 | 12/1983 | Mabon | 360/78 |
| 4,445,157 | 4/1984 | Takahashi | 360/133 |

FOREIGN PATENT DOCUMENTS 2147728 5/1985 United Kingdom ................ 360/106

Primary Examiner—Stuart N. Hecker
Assistant Examiner—David J. Severin
Attorney, Agent, or Firm—Parkhurst & Oliff

[57] ABSTRACT

A magnetic disk drive unit has a carriage which holds a magnetic head and travels in the radial direction of a magnetic disk, a guide shaft for guiding the carriage, a screw shaft placed in a substantially parallel relationship with the guide shaft and rotated by a motor, and a screw engagement portion of the carriage engaging with the screw shaft. One end of the screw shaft is held in a fixed position, and a bearing member supporting the other end of the screwshaft is adjustable to a certain degree. The stop position accuracy (tract position decision accuracy) of the carriage is thereby improved.

3 Claims, 10 Drawing Figures

SCREW SHAFT ADJUSTMENT MEANS FOR A MAGNETIC DISK DRIVE UNIT

BACKGROUND OF THE INVENTION

The present invention relates to a magnetic disk drive unit, more particularly to a type of magnetic disk drive unit in which a screw engagement portion of a carriage for holding a magnetic head is engaged with a screw shaft rotated by motor drive.

FIG. 6 shows a conventional arrangement of a magnetic disk drive unit which carries out transference of a carriage by using a screw shaft.

In this figure, between supports 1 and 2 arranged in a spaced parallel relationship with each other are placed parallel guide shafts 3 and 4, and between the support plates 1 and 2 is also placed a screw shaft 5 which is rotated by the rotation of a motor transmitted through gears 7 and 8. A carriage 9 on which a magnetic head 10 is mounted is supported and guided by guide shafts 3 and 4, and a pin (screw engagement portion) 11 thereof is engaged with a screw portion 5a of the screw shaft 5, so that it is transferred in the radial direction of a magnetic disk (not shown) by the rotation of the screw shaft 5. Numerals 12 denote springs for pressing the pin 11 of the carriage 9 against one of walls forming the root of the screw portion 5a.

In the arrangement described above, the screw shaft 5 must be parallel with the guide shafts 3 and 4, and a deviation of the screw shaft 5 from the parallel relationship thereof results in reduced stop position accuracy of the carriage 9.

For this reason, each part may be designed to be produced at high processing accuracy in order to maintain the above degree of parallelism. However, the control of processing and assembling such parts requires highly complicated steps. Moreover, there is some possibility of deterioration of stop position accuracy (stop position decision accuracy) of the carriage 9, even if the above degree of parallelism is maintained at the expected accuracy.

If the screw pitch of the screw portion 5a of the screw shaft 5 has a tendency to gradually increase or decrease even at minute degree, the stop position accuracy is lowered. For example, when, as shown in FIG. 7, the screw pitch of the screw portion 5a gradually decreases in the direction of increase in the track number (when $P_{m-1} > P_m$ in the figure), the stop position decision accuracy of the carriage 9 shows a tendency to increase negative positional deviations in relation to increase in the track number, as shown in FIG. 8.

The stop position decision accuracy of the carriage 9 may be deteriorated, even if the above three shafts 3, 4 and 5 are parallel to each other and the expected pitch accuracy of the screw portion 5a of the screw shaft 5 is maintained. Since the tensile force of the springs 12 changes in relation to the stop position of the carriage 9, the vertical component Fy of the spring force F acting in the downward direction viewed in FIG. 9 decreases in accordance with the reduction of the spring force F, as shown in the same figure, when a line of action of the spring 12 is deviating from the line of axis of the screw shaft 5.

For this reason, as shown in FIG. 10, the point of contact of the pin 11 tends to rise along the rightward direction viewed in the same figure, while the spring force of the spring 12 is reduced. When the direction of decrease of the spring force corresponds to the direction of increase in the track number, each feed pitch is $P_{n-1} > P_n$ as shown in this figure and represents the characteristic of track position decision accuracy such as shown in FIG. 8. (a dashed line in FIG. 10 indicates the position at which the pin 11 contacts the screw portion 5a by the expected pitch Po.)

It is possible to think that the deterioration in the stop position decision accuracy is caused by the action of other complex factors such as the degree of parallelism of shafts 3, 4 and 5, the pitch accuracy of the screw portion 5a, the tensile force and direction of the spring 12, inertia of the carriage 9, etc. The steps of eliminating all of these factors are laborious and require improvement in the accuracy of parts and assembling steps. There are restrictions, for example, of the direction of tensioning of the spring 12, the degree of design freedom being thereby limited.

SUMMARY OF THE INVENTION

An object of the present invention is to provide a magnetic disk drive unit having high stop position accuracy (track position decision accuracy) of the carriage.

Another object of the present invention is to provide a magnetic disk drive unit which can be adjusted by a simple adjustment step so as to retrieve high stop position accuracy (track position decision accuracy) of the carriage, when the stop position accuracy (track position decision accuracy) of the carriage is deteriorated after the unit is used.

Still another object of the present invention is to provide a magnetic disk drive unit whose stop position accuracy (track position decision accuracy) of the carriage can be heightened by an adjustment step which is carried out after the unit is assembled without heightening accuracy of parts and assembling steps.

To these ends, according to the present invention, there is provided a magnetic disk drive unit comprising: a carriage holding a magnetic head and traveling in the radial direction of the magnetic disk; a guide shaft for guiding the carriage; a screw shaft placed in a substantially parallel relationship with the guide shaft and rotated by a motor; and a screw engagement portion of the carriage engaging with the screw shaft, one end of the screw shaft being held in a fixed position, and an attachment position of the other end thereof being adjustable to a certain degree.

These and other objects, features and advantage of the invention will become clear from the following description of the preferred embodiment when the same is read in conjunction with the accompanying drawings.

BRIEF DESCRIPTION OF THE DRAWINGS

FIGS. 1 to 5 relates to an embodiment of the present invention, in which:

FIG. 1 is a plan view of a feed carriage mechanism which is partially cut;

FIG. 2 is a sectional side elevation of the main part of the same;

FIGS. 3 and 4 are diagrams showing how a screw portion is engaged with a pin;

FIG. 5 is a chart showing the characteristic of stop position accuracy;

DESCRIPTION OF THE PREFERRED EMBODIMENT

Figure 1:
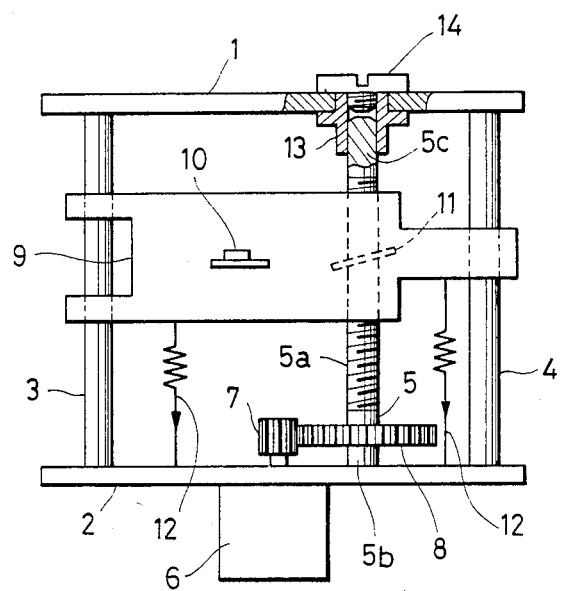

FIGS. 1 to 5 show the embodiment of the present invention, in which between support plates 1 and 2 arranged in a spaced parallel relationship with each other are placed parallel guide shafts 3 and 4, and between the support plates 1 and 2 is also placed a screw shaft 5 which is rotated by the rotation of a motor transmitted through gears 7 and 8. These components are similar to those in the conventional arrangement.

A carriage 9 on which a magnetic head 10 is mounted is supported and guided by the guide shafts 3 and 4, and a pin (screw engagement portion) 11 is engaged with a screw portion 5a of the screw shaft 5, so that it is transferred in the radial direction of a magnetic disk (not shown) by the rotation of the screw shaft 5. Numerals 12 denote springs for pressing the pin 11 of the carriage 9 against one of walls forming the root of the screw portion 5a.

Figure 2:
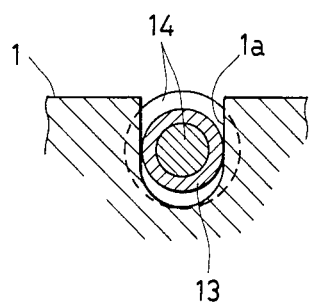

One end 5b of the shaft 5 is supported so as to be rotatable about its axis at a given portion of one of the supporting plates 2 by a suitable bearing means which is not shown in the figures. As shown in FIG. 2, the other end 5c of the screw shaft 5 is fittingly inserted into a bearing 13 which is movable in a bearing slot 1a to a minute degree in the upward and downward direction (in the direction perpendicular to the axis of the screw shaft 5 and to the longitudinal axis of the support plate 1 as viewed in FIG. 1). Numerals 14 indicate a setting screw whose screw portion is engaged with a screw portion of the bearing 13. Thus the position of the bearing, that is, the position of the screw shaft end 5c is determined by screwing and fastening the setting screw 14 and the bearing 13.

Figure 3:
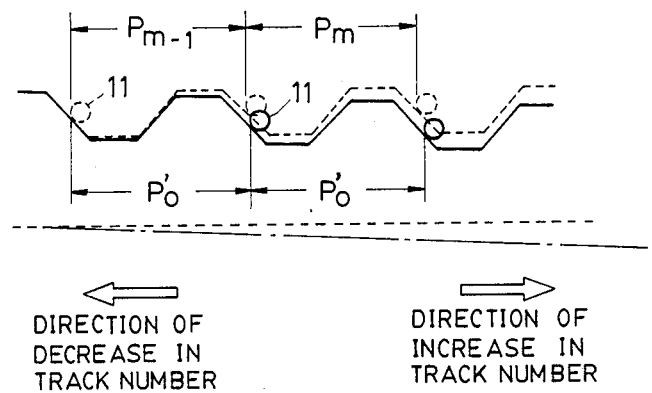
Figure 5:
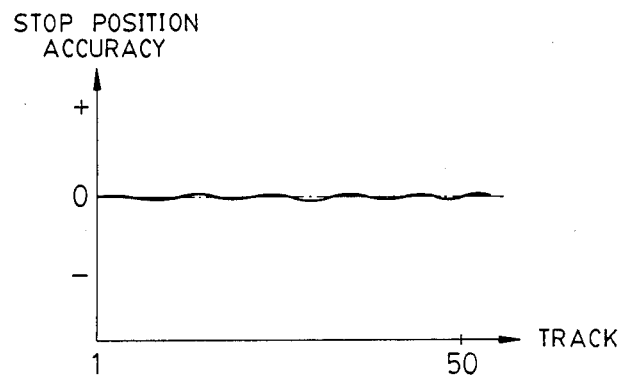
Figure 6:
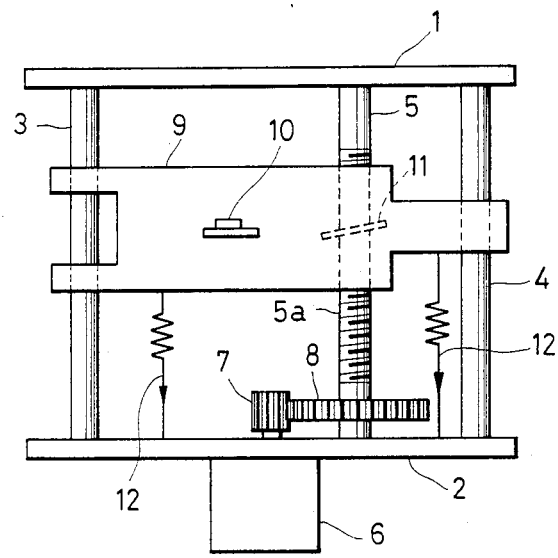
FIG. 6 is a plan view corresponding to FIG. 1.
Figure 7:
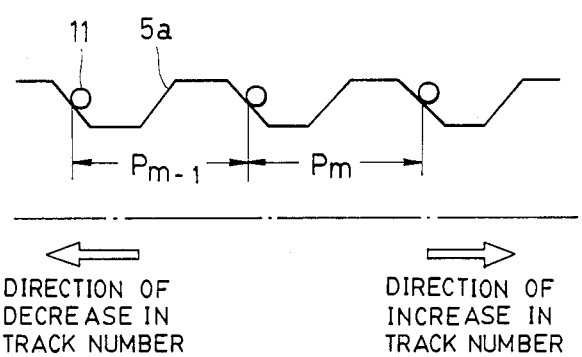
FIGS. 7, 9, 10 are diagrams respectively showing relationship between the screw portion and the pin.
Figure 8:
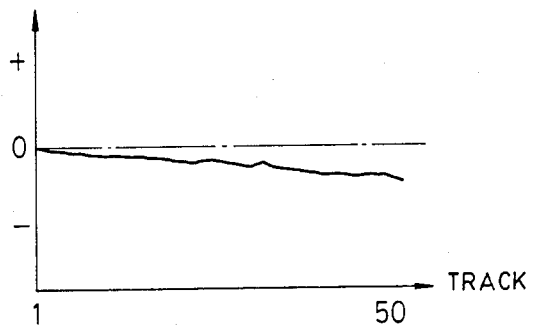
FIG. 8 is a chart showing the characteristic of stop position accuracy.
Figure 9:
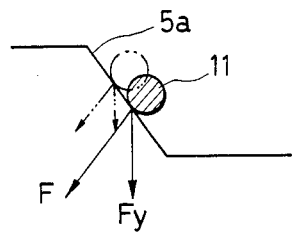
Figure 10:
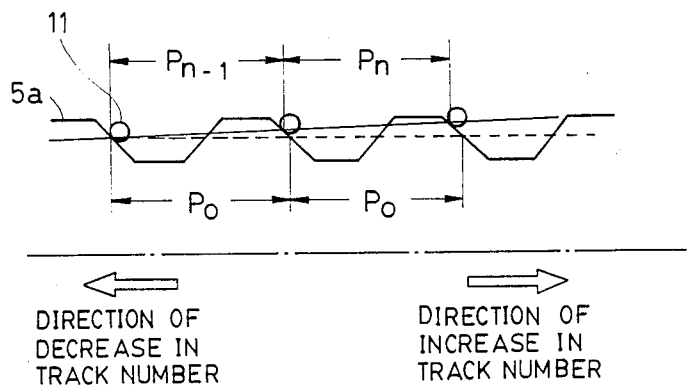

Assuming that the guide shafts 3 and 4 and the screw shaft 5 are mounted in a three-dimensionally parallel relationship with each other, and that the screw pitch of the screw portion 5a of the screw 5 tends to gradually decrease in the direction of, for example, increase in the track number (for example, in the downward direction in FIG. 1), that is, $P_{m-1} > P_m$ as indicated by a dashed line in FIG. 3, as mentioned above, the height of the screw shaft end 5c may be adjusted after loosening of the setting screw 14 so that the contact point between the pin 11 and the screw portion 5a gradually approximates to the root of the thread while it is moved in the direction of increase in the track number, as indicated by the solid line in FIG. 3. The feed pitch is thereby gradually increased by a tiny increment, so that each feed pitch P'o becomes approximately equal to the expected pitch Po, thus stabilizing the stop position accuracy (track position decision accuracy) of the carriage 9 over the whole range of the track position, as shown in FIG. 5. If the pitch of the screw portion 5a tends to gradually increase in the direction of increase in the track number, the end 5c of the screw shaft 5 may be moved and adjusted in the direction opposite that described above.

Figure 4:
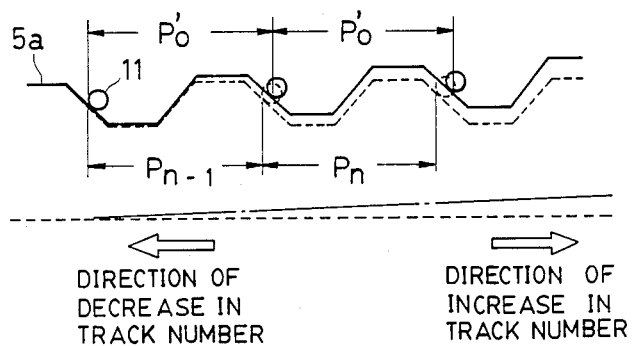

Assuming that the feed pitch decreases in the direction of increase in the track number, because of other factors, while the three shafts 3, 4 and 5 are parallel to each other and the pitch of the screw portion 5a is maintained at the expected accuracy, and that $P_{n-1} > P_n$ as indicated by a dashed line in FIG. 4, as is previously known, the height of the screw shaft end 5c may be so adjusted that the contact point of the pin 11 is maintained at a fixed position on each screw wall portion, as indicated by the solid line in FIG. 4. Each feed pitch P'o is thereby made approximately equal to the expected pitch Po, thus improving the characteristic of stop position accuracy, as shown in FIG. 5. When the feed pitch increases in the direction of increase in the track number, the end 5c of the screw shaft 5 may be moved and adjusted in the direction opposite to that described above.

In the above description, any deterioration in the stop position accuracy is assumed to be caused by a single factor. However, the same adjustment step can be used for the purpose of coping with complex factors such as the attachment accuracy of the screw shaft 5, the accuracy of the screw portion 5a, spring force, inertia, etc. While, in the above example of the position adjustment step, the end 5c of the screw shaft 5 is moved in the upward and downward direction as viewed in FIG. 2, it may be moved and adjusted in a horizontal direction perpendicular to this direction. (In this case, the contact point of the pin 11 changes in accordance with the inclination of the screw shaft 5, the feed pitch decreasing and increasing in accordance with the positiveness and negativeness of inclination of the screw shaft 5.) The screw shaft end 5c may be eccentrically supported by a bearing which can be rotated to provide adjustment.

What is claimed is:

1. A magnetic disk driving device comprising:
    a carriage having a magnetic head mounted thereon, said carriage being adapted for substantially linear movement in the radial direction of a magnetic disk inserted into said magnetic disk driving device;
    a pair of substantially parallel guide shafts, said guide shafts supporting said carriage for movement in said radial direction;
    a screw shaft having threads formed thereon, said screw shaft having an axial centerline extending substantially parallel to said guide shafts and having a first end which is adapted to be rotated by a motor;
    a straight pin fixed on said carriage, said straight pin having an axis extending in a direction which is substantially perpendicular to said screw shaft axis, and said straight pin engaging sidewalls of said threads formed on said screw shaft;
    spring means biassing said carriage in said radial direction against one side wall of said screw shaft threads;
    a first support means, said first support means fixedly supporting said first end of said screw shaft for rotation;
    a bearing member supporting a second end of said screw shaft for rotation;
    a second support means, said second support means comprising a slot extending in a transverse direction which is substantially perpendicular to the axes of said screw shaft and said straight pin, said bearing member being movable within said slot such that said slot guides said bearing member for movement in said transverse direction; and
    fastening means for fixing selectively said bearing member to said second support means;
    wherein movement of said bearing member in said transverse direction alters the position of the centerline of said screwshaft relative to said pin thereby adjusting the traveling pitch of said carriage.

2. The magnetic disk driving device of claim 10, wherein said second support means is a support plate and said slot has one end open to an edge of said support plate.

3. The magnetic disk driving device of claim 11, wherein said fastening means comprises a set screw adapted to be screwed into said bearing member so as to sandwich said support plate between said set screw and said bearing member.

* * * * *